United States Patent [19]

Claxton

[11] 4,180,794
[45] Dec. 25, 1979

[54] TIRE DEFLECTION SENSING METHOD AND APPARATUS

[75] Inventor: William E. Claxton, Mogadore, Ohio

[73] Assignee: The Firestone Tire & Rubber Company, Akron, Ohio

[21] Appl. No.: 958,477

[22] Filed: Nov. 7, 1978

[51] Int. Cl.[2] .................................................. G08B 21/00
[52] U.S. Cl. ...................................... 340/58; 73/146.5; 250/231 R; 356/32
[58] Field of Search ..................... 340/58; 250/231 R; 356/32; 73/146.2, 146.5

[56] References Cited

U.S. PATENT DOCUMENTS

| | | | |
|---|---|---|---|
| 3,873,965 | 3/1975 | Garcia | 340/58 |
| 4,004,270 | 1/1977 | Claxton et al. | 340/58 |
| 4,004,272 | 1/1977 | Claxton et al. | 340/58 |
| 4,071,753 | 1/1978 | Fulenwider et al. | 250/231 R |
| 4,086,564 | 4/1978 | Claxton | 340/58 |

*Primary Examiner*—David L. Trafton

[57] ABSTRACT

A method and apparatus for detecting deflection in a pneumatic tire (10) includes a light source which is transmitted by a transmission line (15,17) to a position internally of the tire (10). The light is reflected off an internal surface of the tire (10) and transmitted to an electronic circuit (25) by a second transmission line (19,21). An alarm (29) will alert the operator of the vehicle of undue tire deflection and, in addition, a visual display (31) can provide the operator with an instantaneous indication of tire deflection.

22 Claims, 4 Drawing Figures

TIRE DEFLECTION SENSING METHOD AND APPARATUS

TECHNICAL FIELD

This invention relates to a method and apparatus for detecting deflection in a pneumatic tire on a vehicle. More particularly, this invention relates to a method and apparatus which senses undue tire deflection, caused for example by a low pressure condition or vehicular overload, and alerts the operator of the vehicle of that condition.

BACKGROUND ART

Under normal conditions the pneumatic tires on a vehicle in motion undergo a certain degree of deflection from their unloaded round condition. However, undue deflection, such as that caused by a low pressure condition or vehicular overload, places undesirable stresses on the tire, causes the tire tread to wear faster and is otherwise a hazard to the safe operation of the vehicle. Such undue deflection may go undetected for hours in situations involving long trips or the like.

A number of devices have been developed to detect low pressure conditions, but all have their drawbacks. Numerous devices utilize radio circuits to provide a low pressure warning. These devices usually require power sources at each wheel to operate a transmitter with the receiver being in the cab of the vehicle. When a low pressure condition is detected, usually by some type of pressure switch or other device communicating with the tire pressure, the transmitter is activated to warn the operator. Such operation is highly susceptible to false alarms from other transmitters or system failure due to the fact that electromagnetic waves can quite often be blocked by the metallic portions of the vehicle body, particularly in the situation involving a tractor-trailer.

Another type of device senses low pressure conditions by counting tire revolutions and comparing such revolutions with the revolutions of a properly inflated tire to determine if a tire has a smaller diameter than the properly inflated tire which would be indicative of a low pressure condition. These devices require a great deal of sophisticated electronic equipment in order to have any degree of accuracy and reliability and are therefore economically unfeasible.

A more feasible and successful device is that shown in U.S. Pat. No. 4,086,564. There a pressure switch continually monitored the tire pressure. A light source at each wheel directed light off of a reflective surface associated with the pressure switch. Under normal pressure conditions the reflected light would be received by a photo transistor once each revolution of the tire. Under abnormal conditions the pressure switch would change the angular orientation of the reflective surface or otherwise block the light so that a sophisticated electronic circuit would alert the operator of the vehicle. Typical of the pressure switch arrangement as described is shown in U.S. Pat. No. 4,004,272.

While successfully operable, the arrangement of these patents required a light source, reflective surface and pressure switch at each wheel which engendered maintenance problems in replacing dead light sources and periodically cleaning at least the reflective surface. In addition, like other prior art, the sophisticated electronic circuitry rendered the system economically unfeasible.

In U.S. Pat. No. 4,004,270 a simpler electronic circuit is disclosed which would tend to assuage some of the above mentioned problems. There it was suggested, for example, that a pair of brushes contacting once each revolution of the tire to close a circuit when a pressure switch indicated a low pressure condition could replace the optical system just described. This system still, however, required a pressure switch at each wheel and in addition was suseptive to further maintenance problems as the brush contacts would periodically have to be replaced.

Finally, in both the devices of U.S. Pat. Nos. 4,004,270 and 4,086,564, even when operating perfectly, only a low pressure condition could be sensed. Undue tire deflection due to a vehicular overload could go undetected.

DISCLOSURE OF INVENTION

It is thus a primary object of the present invention to provide a method and apparatus for detecting undue deflection in a pneumatic tire whether such deflection is caused by an abnormal pressure condition or an overloading of the vehicle.

It is another object of the present invention to provide a method and apparatus, as above, which eliminates the need for any device communicating with and monitoring the pressure of each tire on a vehicle.

It is a further object of the present invention to provide a method and apparatus, as above, which eliminates a multiplicity of components which wear out or need periodic maintenance to be effective.

It is yet another object of the present invention to provide a method and apparatus, as above, which need not be utilized with complex electronic circuitry.

It is still another object of the present invention to provide a method and apparatus, as above, which can be operated to provide an audio or visual alarm upon the occurrence of undue tire deflection or which can provide a constant visual readout of the amount of tire deflection.

These and other objects of the present invention, which will become evident from the description to follow, are accomplished by the means hereinafter described and claimed.

In general, light from a light source is transmitted to a position internally of the pneumatic tire and reflected off an internal surface thereof. The reflected light is transmitted to an electronic circuit which is capable of translating the quantity of reflected light into an indication of the deflection of the tire.

PREFERRED EMBODIMENTS FOR CARRYING OUT THE INVENTION

Figure 1:
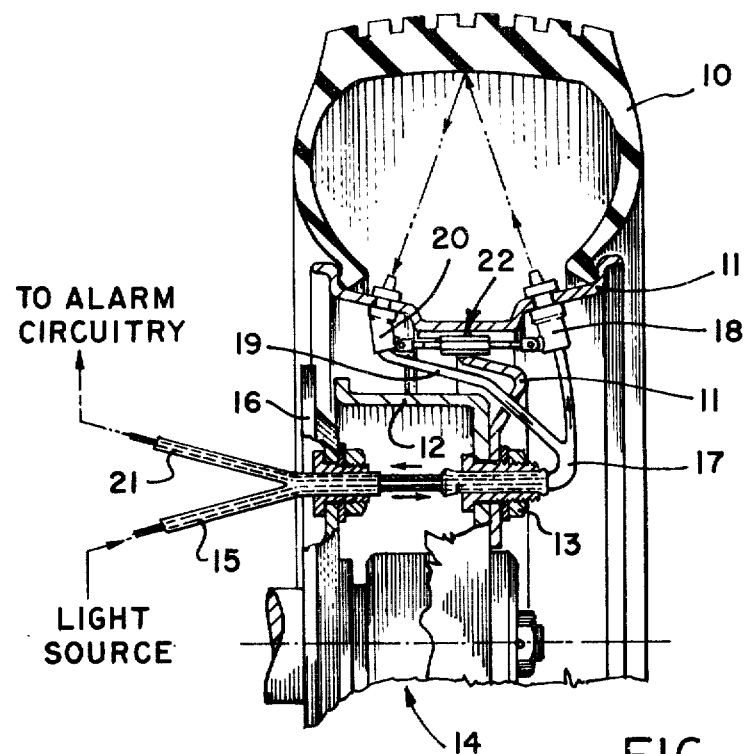
FIG. 1 is a partial cross-section of a pneumatic tire employing the concept of the method and apparatus according to the present invention.

Shown in FIG. 1 is a pneumatic tire 10 mounted on a rim 11 and attached to a conventional rotatable mounting plate 12 by the usual stud and lug nut 13 arrangement. Of course, plate 12 is rotatable by means of the axle and hub assembly indicated generally by the numeral 14.

The method and apparatus which monitors the deflection of tire 10 as it travels through its footprint over the road will now be described in detail, keeping in mind that while reference is being made to a single tire 10, each tire on a vehicle would be provided with the features of this invention. Light from a light source, which may be a standard vehicular lamp conveniently mounted under the hood of the vehicle, is transmitted to the area of the vehicle wheel by a conventional fiber optic transmission line 15. Transmission line 15 is mounted in and extends through stationary plate 16 which could be the splash plate of the vehicle and terminates to focus light between plate 16 and rotatable mounting plate 12. If necessary, a lens could be provided at the end of line 15.

A second fiber optic transmission line 17 extends through rim 11 and plate 12 in any convenient manner so as to be aligned with the end of line 15. One manner to mount line 17 would be to extend it through one of the stud and lug nuts 13, as shown in FIG. 1. The light picked up by line 17 from line 15 once each revolution of the tire is transmitted to the inside of the tire through rim 11. While any form of a sealing mount would be acceptable, a modified conventional tire valve 18 may provide the necessary sealed mount. The light from line 17 is then transmitted to the internal surface of the tire opposite the tread area and reflected back to another fiber optic transmission line 19 mounted in a valve 20 in rim 11. Again although in most instances it would not be necessary, it is possible to place a lens at the end of line 17 to focus the light on the tire.

The reflected light, now picked up by line 19, is transmitted through stud and lug nut assembly 13 and across the air gap to another fiber optic transmission line 21 which transmits the reflected light to the alarm circuitry to be hereinafter described. In order to maximize the amount of reflected light received by line 19 under a no load, no deflection condition and to otherwise "tune" the alarm circuitry, in a manner to be hereinafter described, an adjusting mechanism, schematically shown and indicated generally by the numeral 22, may be incorporated between valves 18 and 20 to change the angular orientation thereof until a maximum amount of reflected light is received.

Thus, at the no load, no deflection condition the maximum amount of light is fed to the alarm circuitry. As a normally loaded, normally pressurized tire goes through its footprint on the road a normal amount of deflection of the tire takes place and slightly less light is reflected back to line 19. As the tire may become under pressurized, over loaded, or otherwise over-deflect for any reason, the angle of reflection will proportionally change thus reflecting even less light back to line 19 and ultimately to the alarm circuitry. If the tire were overpressurized, the angle of reflection would approach the unloaded tuned position providing more light to line 19.

Figure 2:
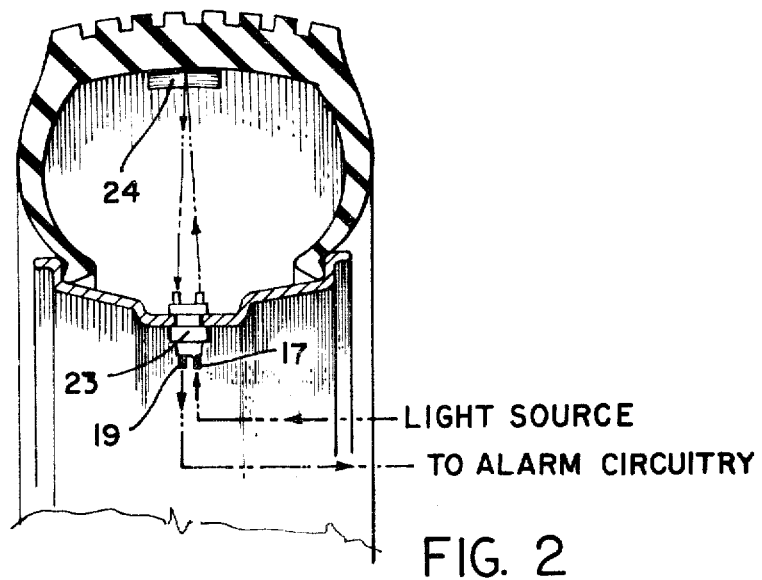
FIG. 2 is a partial cross-section of a pneumatic tire showing an alternate embodiment of the concept of the present invention shown in FIG. 1.

A slight modification in the design of the device in FIG. 1 is shown in FIG. 2. There the two valves 18 or 20, that is, the entry points into the tire, are replaced by one larger valve 23, for example, in the nature of a truck tire valve. In this instance both lines 17 and 19 extend through the valve with the same reflecting procedure with only a smaller angle of reflection. In this embodiment the optimum angle is determined prior to mounting lines 17 and 19 in valve 23 and therefore no adjusting mechanism is necessary. Also shown in FIG. 2, although it could just as readily be utilized in conjunction with the embodiment of FIG. 1, is a reflective surface 24 associated with the inside of the tire. This surface could merely be in the form of a white paint or other reflective material which would not detract from the operation of the tire and would be necessary only if more reflected light were needed at the maximum level previously discussed.

Figure 3:
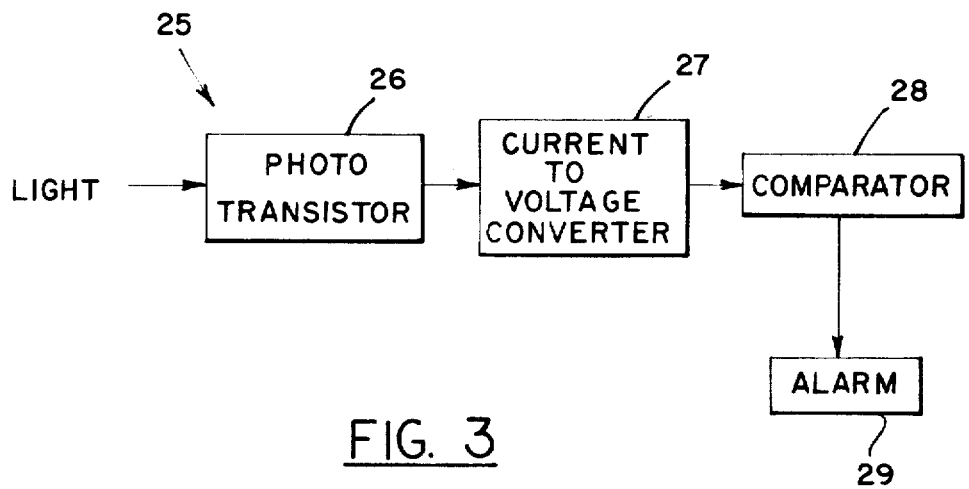
FIG. 3 is a block diagram of the electronic circuitry employed with either of the embodiments of FIGS. 1 and 2.
Figure 4:
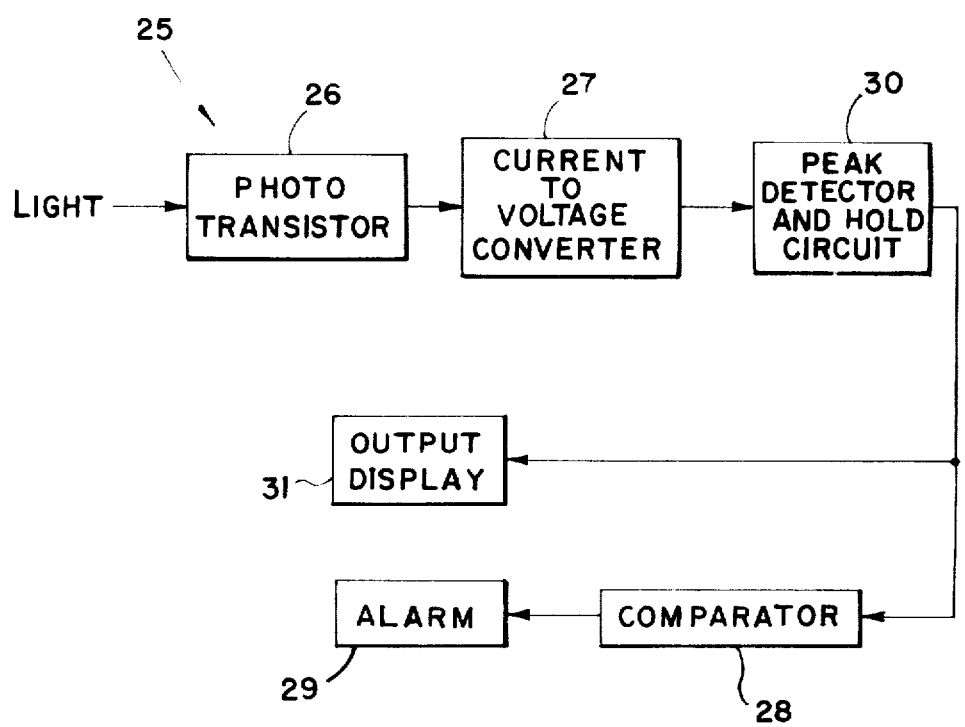
FIG. 4 is a block diagram of an alternative embodiment of the electronic circuitry shown in FIG. 3.

Whether utilizing the design of FIG. 1 or that of FIG. 2, or combinations thereof, the light signal proportional to deflection is fed to an alarm circuit, indicated generally by the numeral 25, two exemplary forms of such being shown in FIGS. 3 and 4. Referring to FIG. 3, the reflected light is received once each revolution of the tire by a light sensing device such as the conventional photo transistor 26 shown or any other suitable device which converts a light signal into a current signal, an avalanche diode also being typical. The output of photo transistor 26 is a current signal or pulse waveform, the amplitude of which is proporational to the amount of light received. This signal is received by a standard current to voltage converter 27 which is calibrated in a manner well known in the art such that its output signal is a voltage signal the maximum amplitude of which corresponds to the amount of light being received at the no load no deflection condition. Thus, for example, because the light is being received once each revolution of the tire, the output of converter 27 would be a square wave voltage signal the amplitude of which, at no load, no deflection, could be calibrated to be some convenient reference voltage, for example, ten volts. In actuality this could be a positive or negative waveform depending on the polarity selected.

The signal from converter 27 is fed to a conventional comparator 28 which has applied thereto a reference voltage proportional to a voltage at which the corresponding deflection would be untolerable. Thus, if it were determined that one inch of deflection were untolerable and at such deflection the quantity of light to photo transistor 26 would only produce a five volt waveform out of converter 27, then comparator 28 would be fed to a five volt reference signal. Then, at any time the voltage out of converter 27 would equal or fall below five volts, an alarm 29 would be activated. The alarm could be of an audio and/or visual type, most typically a buzzer alerting the operator of the vehicle of a problem and/or a light on the dashboard of the vehicle indicating the fact of and specific tire location of the problem.

A modified version of the alarm circuitry 25 is shown in FIG. 4. This circuit is designed to provide a continual visual readout of the current deflection of the tires on a vehicle. Like the circuit of FIG. 3, the reflected light strikes photo transistor 26 whose current signal is converted to a voltage signal proportional to deflection by converter 27. This square wave voltage signal is received by a peak detector and hold circuit 30 which, as is well known in the art, holds the maximum (or minimum) voltage level received during an immediately preceding time interval, the duration of which can be predetermined by conventional design and component choice. This signal is then utilized to drive an output display 31 which could take on numerous forms, one being a series of light emitting diodes (LEDS). Using the ten volt example previously described, a ten segment LED display could be provided with the one LED corresponding to the present voltage being activated. Since the normal deflection of a loaded and heated tire would decrease the amount of light received by photo transistor 26 at the tuned level, a voltage range of, for example, six to eight volts would indicate tolerable tire deflection and could be a green display. A nine or ten volt signal indicative of extreme over inflation and a zero to five volt signal indicative of under inflation and untolerable deflection could be a red display. With such a feature the operator of the vehicle has readily available to him the precise instantaneous deflection of all of the tires on the vehicle and can thus take steps to correct a low pressure condition, for example, before it reaches the untolerable level. Of course, by also sending the signal from circuit 30 to comparator 28, alarm 29 can be activated at the appropriate time to provide an additional warning.

It should thus be evident that a device constructed as described herein and operated according to the method disclosed herein will detect and warn an operator of a vehicle of undue deflection in a tire on the vehicle thus substantially improving the art.

I claim:

1. Apparatus for determining the degree of deflection of a pneumatic tire comprising a light source, means for transmitting the light from said light source to a position internally of the tire to reflect the same off an internal surface of the tire, circuit means for providing an indication of the deflection of the tire, and means for transmitting the reflected light to said circuit means, said circuit means translating the quantity of reflected light into an indication of the deflection of the tire.

2. Apparatus according to claim 1 wherein both said means for transmitting are fiber optic light transmission lines.

3. Apparatus according to claim 1 wherein the tire is mounted on a rim attached to a rotatable wheel which is adjacent a stationary plate, said means for transmitting the light from said light source including a first and second light transmission line, said first light transmission line extending from said light source and through the stationary plate, said second light transmission line extending from a position adjacent said first light transmission line through the wheel and rim and into the tire.

4. Apparatus according to claim 3 wherein said second light transmission line is positioned to send light to an internal surface opposite the tread area thereof.

5. Apparatus according to claim 4 further comprising means on the inside of the tire opposite the tread area thereof to increase the reflectivity of the inside of the tire.

6. Apparatus according to claim 3 wherein said means for transmitting the reflected light includes a third and fourth light transmission line, said third light transmission line extending from a position internally of the tire to pick up reflected light from said second light transmission line and extending through the rim and wheel, said fourth light transmission line extending from a position adjacent said third light transmission line through said stationary plate and to said circuit means.

7. Apparatus according to claim 6 further comprising means to adjust the position of said second and third light transmission lines as they pass through the rim so that a maximum amount of light from said second light transmission line is received by said third light transmission line.

8. Apparatus according to claim 6 wherein said second and third light transmission lines extend through the rim at essentially the same location.

9. Apparatus according to claim 1 wherein said circuit means includes means receiving the light from said means for transmitting the reflected light and providing a signal the amplitude of which is proportional to the deflection of the tire.

10. Apparatus according to claim 9 wherein said circuit means further includes comparator means receiving said signal the amplitude of which is proportional to the deflection of the tire, comparing that signal with a predetermined signal proportional to an untolerable deflection of the tire and providing an output signal upon a match thereof.

11. Apparatus according to claim 10 wherein said circuit means further includes alarm means receiving said output signal of said comparator means and providing an indication of the untolerable deflection of the tire.

12. Apparatus according to claim 9 wherein said circuit means further includes means receiving said signal the amplitude of which is proportional to the deflection of the tire and providing a constant output signal proportional to the amplitude of the last signal received.

13. Apparatus according to claim 12 wherein said circuit means further includes display means receiving said constant output signal and providing a visual readout of the instantaneous deflection of the tire.

14. Apparatus according to claim 12 or 13 wherein said circuit means further includes comparator means receiving said constant output signal, comparing that signal with a predetermined signal proportional to an untolerable deflection of the tire and providing an output signal upon a match thereof, and alarm means receiving said output signal of said comparator means and providing an indication of the untolerable deflection of the tire.

15. Apparatus for detecting the degree of deflection of a pneumatic tire mounted on a rim comprising a light source, a first transmission line transmitting light from said light source, through the rim at a first location and reflecting the light off the inside of the tire opposite the tread area thereof, a second transmission line receiving the reflected light and transmitting the same through the rim at a second location, and electronic means receiving the reflected light from said second transmission line and providing an output signal proportional to the amount of reflected light received and means receiving the output signal of said electronic means and providing a visual display of the deflection of the tire.

16. A method of detecting deflection in a pneumatic tire comprising the steps of providing a source of light, transmitting the light to a position internally of the tire, reflecting the light off an internal surface of the tire, the quantity of the reflected light being indicative of the deflection of the tire, and transmitting the reflected light to a circuit for indicating the deflection of the tire.

17. A method according to claim 16 wherein the pneumatic tire is mounted on a rim attached to a rotatable wheel which is adjacent a stationary member and wherein the step of transmitting the light includes the steps of transmitting the light through said stationary member, through said rotatable wheel and through said rim.

18. A method according to claim 17 wherein the step of transmitting the reflected includes the steps of transmitting the reflected light through said rim, through said rotatable wheel, and through said stationary member.

19. A method according to claim 18 wherein the light and reflected light are transmitted through said rim at an angle and further comprising the step of adjusting the angle to maximize the amount of reflected light.

20. A method according to claim 16 further comprising the step of comparing the quantity of reflected light with a predetermined quantity of light indicative of an untolerable tire deflection.

21. A method according to claim 20 further comprising the step of alerting the operator of the vehicle when the reflected light received by said circuit indicates an untolerable tire deflection.

22. A method of detecting deflection in a pneumatic tire mounted on a rim comprising the steps of providing a source of light, transmitting the light through the rim at a first location, reflecting the light off an internal surface of the tire opposite the thread area thereof, transmitting the reflected light through the rim at a second location, translating the amount of reflected light into an indication of tire deflection, and displaying the indication of tire deflection.

* * * * *